United States Patent
Chuang et al.

(10) Patent No.: US 7,224,474 B2
(45) Date of Patent: May 29, 2007

(54) POSITIONING METHOD FOR BIOCHIP

(75) Inventors: Tsung-Kai Chuang, Tainan (TW); Jiann-Hua Wang, Taipei (TW); Chun-Jung Li, Kaohsiung (TW); Mei-Leng Choi, Tainan (TW); Shu-Fen Lin, Kaohsiung (TW)

(73) Assignee: Kaiwood Technology Co., Ltd., Tainan County (TW)

( * ) Notice: Subject to any disclaimer, the term of this patent is extended or adjusted under 35 U.S.C. 154(b) by 0 days.

(21) Appl. No.: 11/055,143

(22) Filed: Feb. 10, 2005

(65) Prior Publication Data

US 2006/0176492 A1 Aug. 10, 2006

(51) Int. Cl.
*G01N 21/00* (2006.01)
*C12Q 1/68* (2006.01)

(52) U.S. Cl. .................. 356/614; 435/6; 435/287.2
(58) Field of Classification Search ................ 356/614; 435/6, 91.2, 287.2; 536/23.1, 24.3; 422/50, 422/63; 250/458.1, 459.1
See application file for complete search history.

(56) References Cited

U.S. PATENT DOCUMENTS

| | | | |
|---|---|---|---|
| 6,453,243 B1 * | 9/2002 | Watanabe et al. | 702/19 |
| 6,589,778 B1 * | 7/2003 | Hawkins | 435/287.2 |
| 6,646,271 B2 * | 11/2003 | Yokokawa et al. | 250/458.1 |
| 6,673,315 B2 * | 1/2004 | Sheridan et al. | 422/50 |
| 6,902,897 B2 * | 6/2005 | Tweedie et al. | 435/6 |
| 2004/0241667 A1 * | 12/2004 | Chesk et al. | 435/6 |

* cited by examiner

*Primary Examiner*—Sang H. Nguyen

(57) ABSTRACT

Disclosed is a positioning method for biochip spotting, which can spot the bio-probe precisely on the specific position of a biochip substrate, and the steps thereof comprising: (a) providing reference points on a biochip substrate; (b) taking an image of the position of each reference point; (c) calculating a first spotting position and performing spotting according to position information of the image of the positions of reference points of step (b); (d) taking and recording the image of the spotted position; (e) calculating to make feedback correction and setting up the next spotting position according to the position information of the image of step (d) and then performing spotting; and (f) repeatedly performing step (d) to step (e) until all spotting is completed.

11 Claims, 2 Drawing Sheets

POSITIONING METHOD FOR BIOCHIP

BACKGROUND OF THE INVENTION

1. Field of the Invention

The present invention relates to a positioning method for biochip spotting, and especially to a spotting positioning method that marks the positions of reference points on respective biochip substrates and makes feedback correction according to position information.

2. The Prior Arts

The word "biochip" originates in 1980s. Broadly speaking, it means to make bio-related molecules, such as gene, protein, carbohydrate and cell tissue, spotting on a substrate precisely for other uses with technology of micro area and high density. The manufacture of biochip uses several industry technologies and combines bio-medical technology with theories of molecular biology, analytic chemistry and bio-reaction to design for spotting the bio-molecules on the substrate materials of glass, silica plate and plastic (polymer material) to produce bio-chemistry analytic detection component. The advantages of biochip are that the biochip is capable of proceeding simultaneous, fast and mass biochemical detection on micro substrate area and their function or detective subjects are nuclear acid or protein, therefore it has a huge applicability on medical and bio-chemical analysis.

Biochips are divided into two categories according to their function. One is microarray chip (detective chip) and the other is micro-processing chip. The microarray chip, which is more common so far, is to spot bio-probe of high density on a micro area of a substrate to serve as a tool for mass assay and parallel analysis. Generally speaking, the size of a bio-probe on the biochip is not more than 200 μm in diameter, and the bio-probe is positioned in a particular groove or membrane of biochip with an automatic machine through setting parameters, including position in the matrix, length, density, and nucleotide sequence. Currently, there are three common spotting methods as:

(1) Contact spotting: The prepared bio-probes are directly spotted on a biochip with mechanical pins, which has the advantage of being simple and non-limited length of bio-probe. Two kinds of pins, solid pins and quill pins, can be used in this method.

(2) Non-contact jetting printing: The technology is similar to ink-jet printer, and it can print bio-probes on the surface of a biochip with a pattern of matrix.

(3) Photolithography: Photoetching is employed to synthesize bio-probes directly on a biochip, which is similar to the semiconductor technology.

Producing the "microarray chip" is to make some kinds of known specific bio-probes, such as protein and nucleotide, which are used as special detective elements spotted in rows on specific positions of the substrate in accordance with set order using the methods described above with a set of high precision mechanic equipment. A normal slide glass for microscope can be spotted with thousands or even dozens of thousands strictly aligned probes. Since the bio-probe put is very small, generally it can only be seen clearly under a microscope. In using the biochip, it is to make the sample being detected react with the bio-probe on the biochip to show the specific meaning of many actions among bio-molecules through the result of the reaction.

Since the bio-probes on the biochip are of a large number and a small volume, all the ways to maintain good respective relative position, distance and the specific position on the biochip will affect the result and interpretation of reaction afterward. Therefore, it becomes the important subject and direction of improving the yield of biochip production and success rate and reliability level of following experiments of biochip by controlling the spotting position of bio-probe on the biochip to form precise matrix on the specific area desired.

The spotting can proceed by batch according to the known technology. It can set the first spotting position of the first biochip substrate as the datum point, and then every spotting position of all the biochip substrates was determined according to the position of that datum point added with a constant distance to complete the spotting of the entire batch of biochip substrate sequentially. However, since the size of different chip of biochip substrate, which is usually glass or Nylon membrane, could have errors, and since the size of the bio-probe on the biochip is generally not more than 200 μm in diameter with the spacing distance in the order of micrometer, even a tiny error of substrate could result in the enlargement, reduction, distortion of spotting matrix or loss of matrix points, which in turn affects the following binding reaction, signal scanning, data analysis and increases the difficulty level and error rate of interpretation. It could even result in the entire batch of biochip being defective and unable to use. Furthermore, since the bio-probes are usually bio-material, which is not readily available, defective spotting will waste the precious bio-probes. Moreover, although distortion or error of biochip can be adjusted or treated with other methods, they all increase the time and cost of treatment massively.

An image alignment apparatus and method for microarray biochip produced by jet-printing technology is disclosed in Taiwan Patent No. 561070 which applies the principle of color jet printing system to the spotting of biochip. An image-taking device is arranged on a transportation device to allow the image-taking device to move relative to a printhead. An alignment sheet is employed to set the printhead to a previously determined position before the bio-reagents are jetted to a microarray biochip substrate in the form of micro liquid droplets.

However, the method is an improvement especially for spotting manner of non-contact jetting printing in which the printhead can hold still during the process of jetting but change the position of the substrate to proceed with spotting. It is totally different from the basic principle and method of spotting manner of contact spotting in which the spotting pin is at status of motion, and so it can not be used as well. Furthermore, it still has the same problem which happened often in the paper printing that the incorrect placement of paper will result in the shift and rotation of printing if the placement position of the biochip substrate during spotting is not proper. Moreover, the patent mentioned above needs to make the respective alignment of each other among printhead, alignment sheet and substrate to achieve more precise alignment, and so the procedure of alignment is more complicated and it is more difficult to control.

SUMMARY OF THE INVENTION

The positioning method for biochip spotting and the positioning apparatus thereof provided by the present invention is to solve the problem described above.

The present invention is to effectively solve the problems such as enlargement, reduction, distortion of microarray matrix or loss of microarray point of known technology to provide a positioning method for biochip spotting which directly marks the positions of specific reference points on each respective biochip substrate and then proceeds with spotting, and makes feedback correction of every spotting position with image-taking in the process of spotting to avoid the problem of shift and rotation of spotting position and the change of relative distance caused by the size difference of biochip substrate and incorrect position of placement of known technology.

One object of the present invention is to provide a positioning method for biochip spotting to spot the bio-probe precisely on the specific position of biochip substrate, and the steps thereof comprising: (a) providing reference points on a biochip substrate; (b) taking an image of the position of each reference point; (c) calculating a first spotting position and performing spotting according to position information of the image of the positions of reference points of step (b); (d) taking and recording the image of the spotted position; (e) calculating to make feedback correction and setting up the next spotting position according to the position information of the image of step (d) and then performing spotting; and (f) proceeding repeatedly from step (d) to step (e) until all spotting are completed.

Another object of the present invention is to provide a positioning apparatus for biochip spotting, which can make adjustment and correction for each respective biochip substrate and spotting point to make the bio-probe used spotting precisely on the specific area desired.

The positioning method for biochip spotting of the present invention is not only more convenient and simple than known technology but also can solve the problem caused by error of size and position of biochip substrate that cannot be overcome by known technology. Besides, the method provided by the present invention can control the spotting position of bio-probe on the biochip substrate to make accurate matrix on the specific area desired and hence increase the yield of biochip production and improve the difficulty level and error rate of following binding reaction, signal scanning, data analysis and interpretation and increase the success rate and reliability level of entire assay. Moreover, it has economic effects of reducing the wasting of precious bio-probe and increasing the spotting number of each biochip and enlarging area capable of spotting. Furthermore, the positioning apparatus used for spotting thereof can be adapted to different spotting system and hence it is quite practical.

The embodiment of the present invention is further explained in the following embodiment examples and more detailed description.

It is to be understood that both the foregoing general description and the following detailed description are exemplary and explanatory which are intended to provide further explanation of the invention as claimed. The present invention disclosed above is not limited by these examples. The present invention may be altered or modified a bit and all such variations are within the scope and spirit of the present invention.

DETAILED DESCRIPTION OF THE PREFERRED EMBODIMENT

Here we provide preferred embodiment and detailed description as following for the technologies and means used and functions thereof of the present invention.

Figure 1:
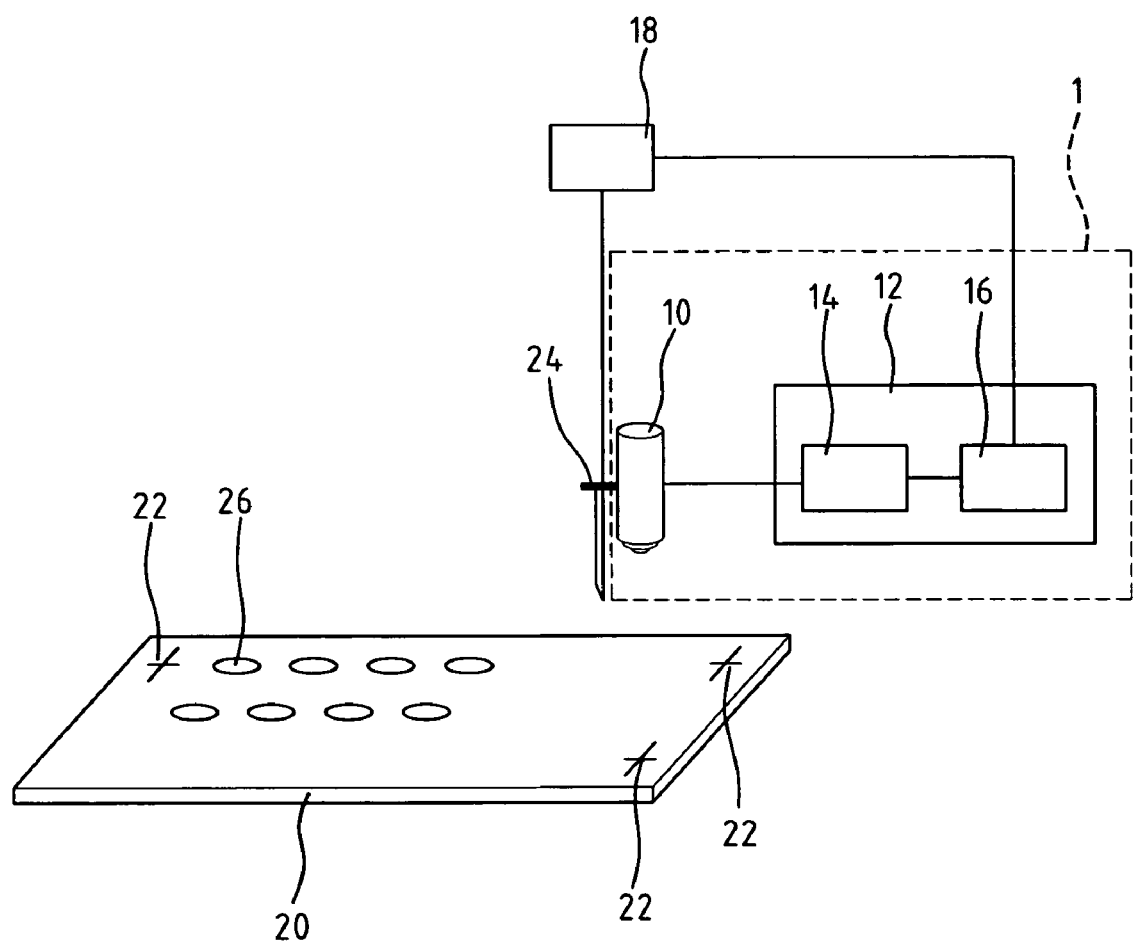
FIG. 1 is a diagram showing the embodiment of a positioning method for biochip spotting in the present invention.

To achieve the objects described above, the present invention provides a positioning apparatus 1 (as shown in FIG. 1) for biochip spotting, which comprises an image-taking device 10 and a position-adjusting system 12. The image-taking device 10 is used for taking and recording the position of each of a plurality of reference points and spotted points on the biochip substrate. The position-adjusting system 12 calculates the correct position of every next spotting and controls to perform spotting according to the position information acquired by the image-taking device 10. The position apparatus 1 can be set at the proper position of the spotting system to get the mostly accurate spotting position. The position-adjusting system 12 comprises a calculation unit 14 and a controlling unit 16. The calculation unit 14 calculates the next spotting position according to the position information acquired by the image-taking device 10 and transfers the next spotting position information to the controlling unit 16. The controlling unit 16 controls spotting based on the next spotting information.

Figure 2:
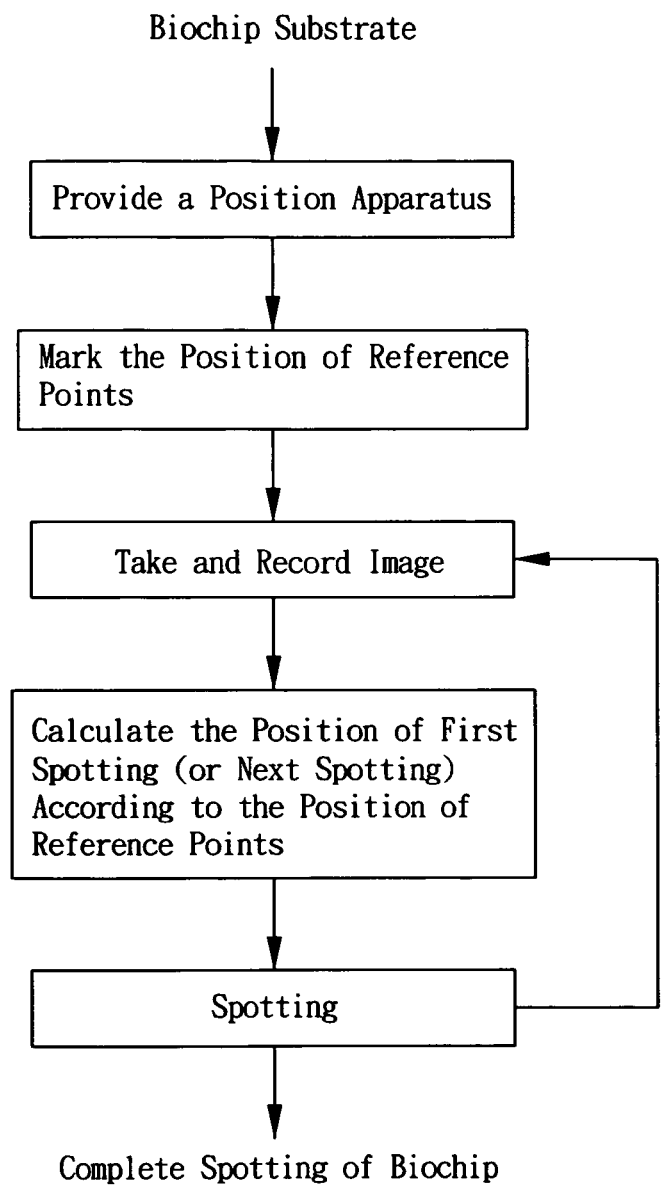
FIG. 2 is a flowchart showing the steps of a positioning method for biochip spotting in the present invention.

Besides, the positioning method for biochip spotting provided by the present invention comprises the steps of providing a position apparatus 1 for biochip spotting as described above (see FIG. 1 and FIG. 2). Reference points 22 are marked on each biochip substrate 20. The image-taking device 10 takes and records the positions of the reference points 22 on the biochip substrate 20. The position-adjusting system 12 comprises a calculation unit 14 and a controlling unit 16, and the calculation unit 14 calculates and gets the next spotting position according to the position information acquired by the image-taking device 10 and transfers the next spotting position information to the controlling unit 16. The controlling unit 16 controls a driving device 18 to move the spotting pinhead 24 to perform the first spotting according to the position. Next, the image-taking device 10 is used to take and record the image of spotting position of bio-probe 26 then math calculation is performed according to image taken by the above-described step to make feedback correction and set up the position of next spotting to perform spotting. The steps of image-taking and feedback correction of spotting are repeated until all spotting is completed.

When marking the reference points, it is preferred to mark at least two positions of reference points since coordinates of arbitrary two points can decide a line and the following spotting can be performed more accurately. The method of marking can be labeling with fluorescence material on the substrate or carving on the arbitrary position chosen on the substrate by a diamond knife, a laser beam, or lithography method. The symbols for marking positions of reference points are not limited particularly as long as the specific position can be identified and so the symbols used can be the same or different.

During math calculation, it can use any related computer software to calculate the positions of first spotting and following spotting according to the position information of set reference points and make feedback correction according to the position information of every spotting that has been done to calculate correct position of next spotting.

In another preferred embodiment, the image-taking device comprises a photography device and a display device; the photography device is used to take the image of the biochip substrate and the display device is used to display the image taken by the photography device.

And, the photography device comprises a camera and an image processing unit; the camera is used to take the image of the biochip substrate and the image processing unit is used to process the image taken by the camera. Wherein the camera is a CCD (Charge Coupled Device) camera or a CMOS (Complementary Metal Oxide Semiconductor) camera.

According to the above-described description and embodiment, the positioning method and apparatus for biochip spotting of the present invention can control the spotting position of bio-probe on the biochip substrate to make accurate matrix on specific area desired and so it can improve the yield of biochip production and success rate and reliability level of following experiments, and reduce the wasting of precious bio-probe and hence increase the spotting number of each biochip and enlarge the area capable of spotting.

What is claimed is:

1. A positioning method for biochip spotting, comprising, the following steps:
    (a) providing reference points and spotting positions on a biochip substrate;
    (b) taking an image of the position of each reference point and an image of the position of each spotting position to calibrate the position of the biochip substrate;
    (c) calculating a first spotting position and performing spotting according to position information of the images of the positions of reference points of step (b);
    (d) taking and recording the image of the spotted position;
    (e) calculating to make feedback correction for reducing error of size and spotted position and set up a next spotting position according to position information of the image of step (d) and then performing spotting; and
    (f) repeating step (d) to step (e) until all spotting is completed on the biochip substrate.

2. The positioning method according to claim 1, wherein the reference points of step (a) are plural.

3. The positioning method according to claim 1, wherein the reference points of step (a) are at least two points.

4. The positioning method according to claim 1, wherein the reference points of step (a) are marked with fluorescence material.

5. The positioning method according to claim 1, wherein the reference points of step (a) are marked with carving by a diamond knife.

6. The positioning method according to claim 1, wherein the reference points of step (a) are marked with carving by a laser beam.

7. The positioning method according to claim 1, wherein the reference points of step (a) are marked with carving by lithography method.

8. The positioning method according to claim 1, wherein the reference points of step (a) are marked with identical symbol.

9. The positioning method according to claim 1, wherein the reference points of step (a) are marked with different symbol.

10. The positioning method according to claim 1, wherein the calculation method is calculating with computer software.

11. A positioning apparatus for biochip spotting according to claim 1.

* * * * *